US012325402B2

(12) United States Patent
Nguyen et al.

(10) Patent No.: US 12,325,402 B2
(45) Date of Patent: Jun. 10, 2025

(54) METHODS AND SYSTEMS FOR ADAPTIVE TRAILER BRAKE CONTROL

(71) Applicant: GM GLOBAL TECHNOLOGY OPERATIONS LLC, Detroit, MI (US)

(72) Inventors: Michael Nguyen, Stoney Creek (CA); Todd J. Brinkman, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 18/328,138

(22) Filed: Jun. 2, 2023

(65) Prior Publication Data

US 2024/0400016 A1    Dec. 5, 2024

(51) Int. Cl.
*B60T 8/32*     (2006.01)
*B60T 7/20*     (2006.01)
*B60T 8/17*     (2006.01)

(52) U.S. Cl.
CPC ............. *B60T 8/323* (2013.01); *B60T 7/20* (2013.01); *B60T 8/1708* (2013.01)

(58) Field of Classification Search
CPC .................... B60T 8/323; B60T 7/20
See application file for complete search history.

(56) References Cited

U.S. PATENT DOCUMENTS

| | | | |
|---|---|---|---|
| 2018/0105172 A1* | 4/2018 | Gesch | B60W 30/14 |
| 2018/0339685 A1* | 11/2018 | Hill | B60T 13/662 |
| 2019/0270436 A1* | 9/2019 | Brütt | B60T 8/1708 |
| 2019/0366989 A1* | 12/2019 | James | B60T 8/1708 |
| 2020/0189336 A1* | 6/2020 | Sharma | B60T 7/22 |
| 2021/0139008 A1* | 5/2021 | DiGioacchino | B60T 8/1708 |
| 2021/0188279 A1* | 6/2021 | Glavinic | B60W 10/184 |

* cited by examiner

*Primary Examiner* — Long T Tran
(74) *Attorney, Agent, or Firm* — Lorenz & Kopf LLP (57) ABSTRACT

Methods and systems are provided for controlling deceleration of a vehicle towing a trailer. In an embodiment, a method includes: generating, by a processor, trailer brake command data to pulsate brakes of the trailer; in response to the generating the trailer brake command data, storing, in a data storage device of the vehicle, a first set of deceleration data; generating, by the processor, vehicle brake command data to pulsate brakes of the vehicle; in response to the generating the vehicle brake command data, storing, in the data storage device, a second set of deceleration data; determining, by the processor, a maximum vehicle brake torque threshold where a maximum trailer brake output occurs based on the first set of deceleration data and the second set of deceleration data; and controlling, by the processor, the brakes of the trailer based on the maximum vehicle brake torque threshold.

20 Claims, 5 Drawing Sheets

METHODS AND SYSTEMS FOR ADAPTIVE TRAILER BRAKE CONTROL

INTRODUCTION

The technical field generally relates to vehicles and, more specifically, to methods and systems for controlling vehicles with trailers to optimize brake feel while towing.

Various vehicles may serve as tow vehicles for towing a trailer. Some vehicle and trailer systems allow a driver to command application of brakes of the trailer using a mechanical interface provided in the vehicle. For example, the brakes of all wheels of the trailer can be applied at the same time and at the same magnitude. Vehicle and trailer brakes can be used in conjunction to ensure a smooth braking operation of the combined system. In some instances, the feel of smooth brake operation perceived by the driver is subjective.

Accordingly, it is desirable to provide methods and systems for controlling brakes of a trailer to improve the subjective qualities of a trailer braking maneuver. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiments, methods and systems are provided for controlling deceleration of a vehicle towing a trailer. In one embodiment, a method includes: generating, by a processor, trailer brake command data to pulsate brakes of the trailer; in response to the generating the trailer brake command data, storing, in a data storage device of the vehicle, a first set of deceleration data: generating, by the processor, vehicle brake command data to pulsate brakes of the vehicle: in response to the generating the vehicle brake command data, storing, in the data storage device, a second set of deceleration data; determining, by the processor, a maximum vehicle brake torque threshold where a maximum trailer brake output occurs based on the first set of deceleration data and the second set of deceleration data; and controlling, by the processor, the brakes of the trailer based on the maximum vehicle brake torque threshold.

In various embodiments, the method includes: associating the first set of deceleration data with the trailer brake command signal to obtain a first set of associated data, associating the second set of deceleration data with the vehicle brake command signal to obtain a second set of associated data, and wherein the storing comprises storing the first set of associated data and the set second of associated data, and wherein the determining the maximum vehicle brake torque threshold is based on the first set of associated data and the second set of associated data.

In various embodiments, the method includes: determining, by the processor, a maximum trailer induced deceleration threshold based on the first set of deceleration data, and wherein the determining the maximum vehicle brake torque threshold is based on the maximum trailer induced deceleration threshold.

In various embodiments, the method includes: determining a first slope from the second set of deceleration data: determining a second slope from a desired set of deceleration data; and wherein the determining the maximum vehicle brake torque threshold is based on the maximum trailer induced deceleration threshold divided by a difference between the second slope and the first slope.

In various embodiments, the method includes: receiving, based on user interface data, a desired maximum vehicle brake torque threshold, and wherein the determining the maximum vehicle brake torque threshold is based on the desired maximum vehicle brake torque threshold.

In various embodiments, the method includes: receiving, based on user interface data, a desired minimum activation energy threshold, and wherein the determining the maximum vehicle brake torque threshold is based on the desired maximum vehicle brake torque threshold.

In various embodiments, the method includes: applying a speed-based correction factor to at least one of the first set of deceleration data and the second set of deceleration data.

In various embodiments, the method includes: determining, by the processor, a minimum activation energy threshold based on the first set of data, and wherein the controlling the brakes of the trailer is further based on the minimum activation energy threshold.

In various embodiments, the method includes: determining, by the processor, gain control data based on the maximum vehicle brake torque threshold and the minimum activation energy threshold, and wherein the controlling the brakes is based on the gain control data.

In various embodiments, the method includes: receiving, based on user interface data, a desired minimum activation energy threshold, and wherein the determining the minimum activation energy threshold is based on the desired minimum activation energy threshold.

In another embodiment, a system for controlling deceleration of a vehicle towing a trailer includes a computer readable medium configured to store deceleration data associated with the vehicle towing the trailer; and a processor onboard the vehicle and configured to: when the vehicle is towing the trailer, generate trailer brake command data to pulsate brakes of the trailer: in response to the trailer brake command data, store in the computer readable medium a first set of the deceleration data: generate vehicle brake command data to pulsate brakes of the vehicle: in response to the vehicle brake command data, store in the computer readable medium a second set of the deceleration data: determine maximum vehicle brake torque threshold where a maximum trailer brake output occurs based on the first set of the deceleration data and the second set of the deceleration data; and control the brakes of the trailer based on the maximum vehicle brake torque threshold.

In various embodiments, the processor is further configured to: associate the first set of the deceleration data with the trailer brake command signal to obtain a first set of associated data: associate the second set of the deceleration data with the vehicle brake command signal to obtain a second set of associated data: store the first set of associated data and the set second of associated data; and determine the maximum vehicle brake torque threshold based on the first set of associated data and the second set of associated data.

In various embodiments, the processor is further configured to: determine a maximum trailer induced deceleration threshold based on the first set of the deceleration data; and determine the maximum vehicle brake torque threshold based on the maximum trailer induced deceleration threshold.

In various embodiments, the processor is further configured to: determine a first slope from the second set of the deceleration data: determine a second slope from a desired set of the deceleration data; and determine the maximum vehicle brake torque threshold based on the maximum trailer induced deceleration threshold divided by a difference between the second slope and the first slope.

In various embodiments, the processor is further configured to: receive, based on user interface data, a desired maximum vehicle brake torque threshold; and determine the maximum vehicle brake torque threshold based on the desired maximum vehicle brake torque threshold.

In various embodiments, the processor is further configured to: receive, based on user interface data, a desired minimum activation energy threshold; and determine the maximum vehicle brake torque threshold based on the desired maximum vehicle brake torque threshold.

In various embodiments, the processor is further configured to: determine a minimum activation energy threshold based on the first set of the deceleration data; and control the brakes of the trailer further based on the minimum activation energy threshold.

In various embodiments, the processor is further configured to: determine gain control data based on the maximum vehicle brake torque threshold and the minimum activation energy threshold; and control the brakes of the trailer based on the gain control data.

In various embodiments, the processor is further configured to: receive, based on user interface data, a desired minimum activation energy threshold; and determine the minimum activation energy threshold based on the desired minimum activation energy threshold.

In another embodiment, a vehicle includes: a connection apparatus configured to connect to a trailer having brakes: a computer readable medium configured to store deceleration values associated with the vehicle towing the trailer; and a processor onboard the vehicle and configured to: when the vehicle is towing the trailer, generate trailer brake command data to pulsate the brakes of the trailer: in response to the trailer brake command data, store in the computer readable medium a first set of the deceleration data: generate vehicle brake command data to pulsate brakes of the vehicle: in response to the vehicle brake command data, store in the computer readable medium a second set of the deceleration data: determine a minimum activation energy threshold based on the first set of deceleration data: determine a maximum vehicle brake torque threshold where a maximum trailer brake output occurs based on the first set of deceleration data and the second set of deceleration data; and control, via the connection apparatus, the brakes of the trailer based on the maximum vehicle brake torque threshold and the minimum activation energy threshold.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
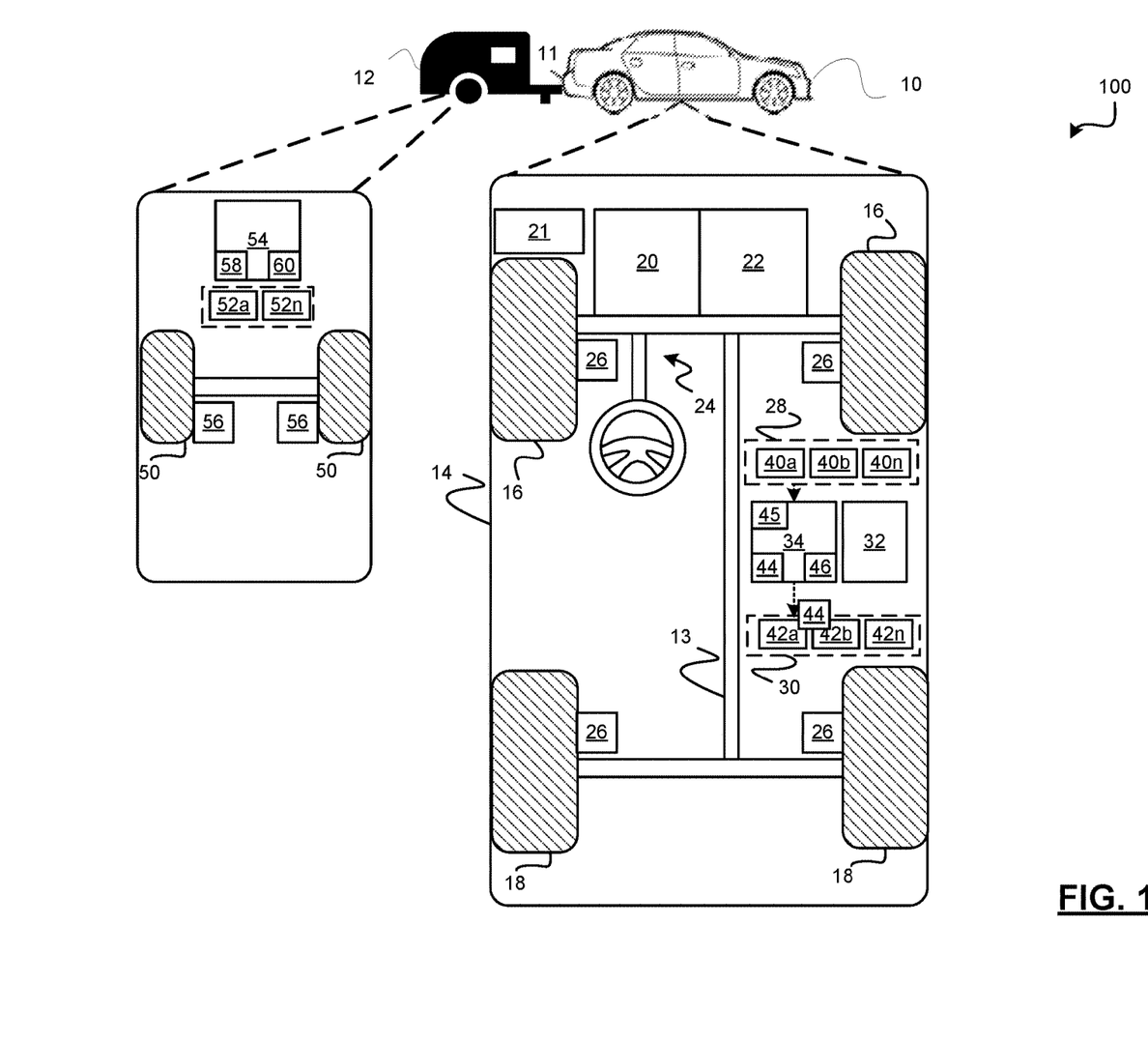
FIG. 1 is a functional block diagram of a vehicle that includes a braking system for controlling brakes of a trailer that is towed by the vehicle, in accordance with various embodiments.

With reference to FIG. 1, a braking control system shown generally at 100 is associated with a vehicle 10 and a trailer 12 in accordance with various embodiments. The vehicle 10 is configured to couple to and connect to the trailer 12 via a connection apparatus 11 and is configured to tow the trailer 12. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to components of the trailer 12.

As described in greater detail further below, the braking control system 100 includes a computer system configured to control braking of the vehicle 10 and braking of the trailer 12. In general, the computer system is configured to monitor deceleration information of the vehicle 10 while the vehicle 10 and the trailer 12 pulsate their brakes separately and while doing so characterize the braking authority of each of the vehicle 10 and the trailer 12 separately. Based on the characterized braking authorities, the computer system is configured to compute and assign appropriate trailer braking commands to specific vehicle braking torques to achieve a combined deceleration of the vehicle 10 and the trailer 12 at desired levels.

In various embodiments, the vehicle 10 comprises an automobile. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms capable of towing and is not limited to an automobile.

As depicted in FIG. 1, the exemplary vehicle 10 generally includes a chassis 13, a body 14, front wheels 16, and rear wheels 18. The body 14 is arranged on the chassis 13 and substantially encloses components of the vehicle 10. The body 14 and the chassis 13 may jointly form a frame. The wheels 16-18 are each rotationally coupled to the chassis 13 near a respective corner of the body 14.

The vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle and/or of the vehicle itself. The sensing devices 40a-40n can include, but are not limited to, radars, lidars, global positioning systems, optical cameras, thermal cameras, ultrasonic sensors, inertial measurement units, pressure sensors, position sensors, speed sensors, and/or other sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for controlling the vehicle. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The communication bus 45 serves to transmit programs, data, status and other information or signals between the various components of the vehicle 10 and/or the trailer 12. The communication bus 45 can be any suitable physical or logical means of connecting computer systems and components. This includes, but is not limited to, direct hard-wired connections, fiber optics, infrared and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the braking control system 100 and, when executed by the processor 44, control braking events of the vehicle 10 and the trailer 12 while monitoring deceleration information of the vehicle 10 in order to characterize the braking authority of the vehicle 10 separately from the braking authority of the trailer 12. The instructions, when executed by the processor 44 assign braking commands to the trailer 12 based on the characterized braking authority.

As depicted in FIG. 1, in various embodiments, the trailer 12 also includes a plurality of wheels 50, as well as one or more sensors 52a-52n, a controller 54, and/or a braking system 56 associated with the wheels 50. In various embodiments, the sensors 52a-52n of the trailer 12 provide sensor data pertaining to the trailer 12. Also in various embodiments, the controller 54 of the trailer 12 may include a processor 58 and computer readable storage device or media 60 that provide certain functions described in connection with the controller 34 of the vehicle 10. In addition, in various embodiments, the trailer braking system 56 may provide braking through brakes of the trailer 12, for example in accordance with instructions/commands provided by the controller 34 of the vehicle 10 (and/or, in certain embodiments, via the controller 54 of the trailer 12).

It will be appreciated that the controllers 34, 54 may otherwise differ from the embodiment depicted in FIG. 1. For example, the controllers 34, 54 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controllers 34, 54 may also otherwise differ from the embodiment depicted in FIG. 1, for example in that the computer system of the controllers 34, 54 may be coupled to or may otherwise utilize one or more remote computer systems and/or other control systems.

Figure 2:
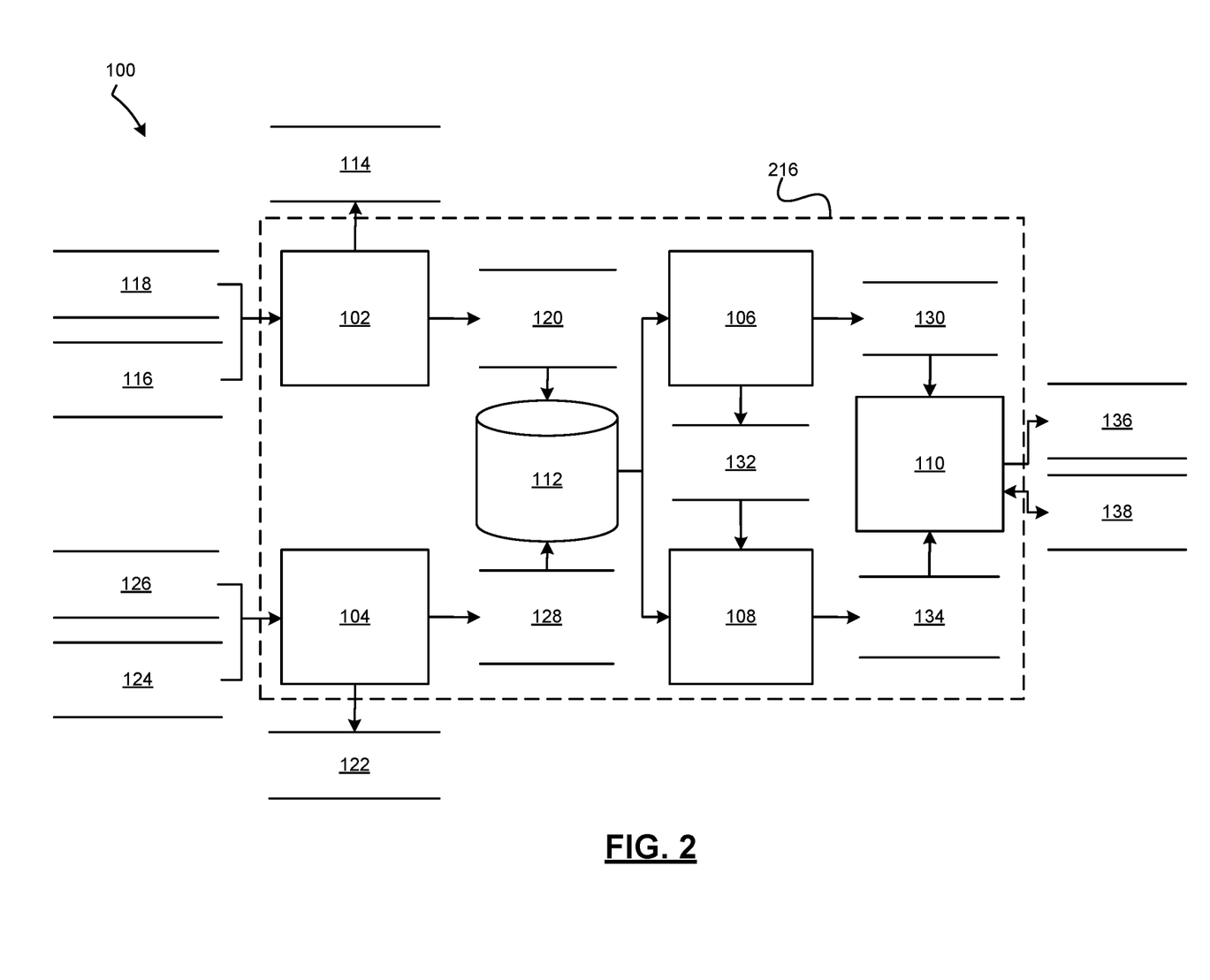
FIG. 2 is a dataflow diagram illustrating the braking control system of the vehicle of FIG. 1, in accordance with various embodiments.

With reference to FIG. 2 and with continued reference to FIG. 1, a dataflow diagram illustrates elements of the braking control system 100 of FIG. 1 in accordance with various embodiments. As can be appreciated, various embodiments of the braking control system 100 according to the present disclosure may include any number of modules embedded within the controller 34 which may be combined and/or further partitioned to similarly implement systems and methods described herein. Furthermore, inputs to the braking control system 100 may be received from the sensor system 28, received from other control modules (not shown) associated with the vehicle 10 and/or the trailer 12, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

In various embodiments, the braking control system 100 includes a trailer brake deceleration data monitoring module 102, a vehicle brake deceleration monitoring module 104, a trailer brake data determination module 106, a vehicle brake data determination module 108, a trailer gain control module 110, and deceleration information datastore 112.

Figure 3A:
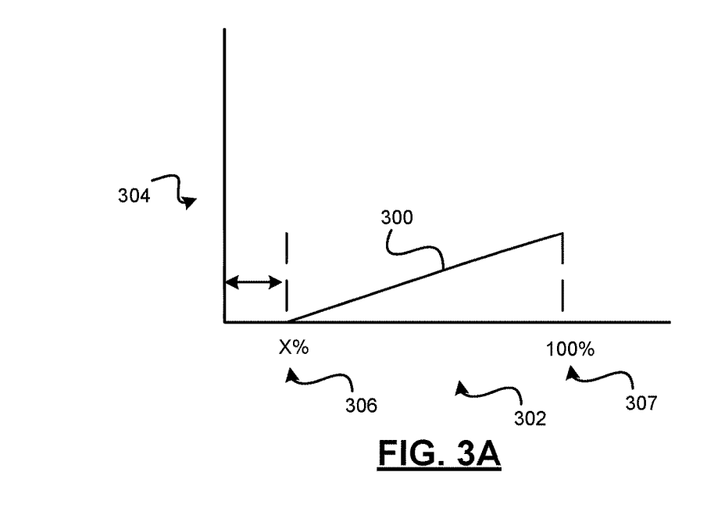
FIGS. 3A, 3B, and 3C are graphs illustrating data used by the braking control system for trailer braking, in accordance with various embodiments.

The trailer brake deceleration data monitoring module 102 generates command data 114 to activate pulsating of the trailer brakes of the trailer braking system 56. For example, the pulsating can occur with a cycle time (e.g., one second), a releasing time (e.g., 400 milliseconds), and a brake activation time (e.g., 600 milliseconds). The trailer brake deceleration data monitoring module 102 receives and collects deceleration data 116 and brake command data 118 in response to the commands that are sent to pulsate the trailer brakes of the trailer braking system 56. The trailer brake deceleration data monitoring module 102 averages the deceleration information per command pulse according to an averaging window (e.g., 300 milliseconds) and optionally applies a speed-based correction factor to the average. The trailer brake deceleration data learning module 102 assigns the average deceleration information to the commanded value to obtain the data 300 such as shown in FIG. 3A, where the brake command (pulse width modulated percent) is shown along the x-axis 302 and the deceleration data is shown along the y-axis 304.

In various embodiments, the trailer brake deceleration data monitoring module 102 performs one or more quality checks on the collected data such as, but not limited to, ensuring a minimum number of data points, performing a regression check, etc., and then stores the trailer braking deceleration data 120 in the deceleration information datastore 112.

Figure 3B:
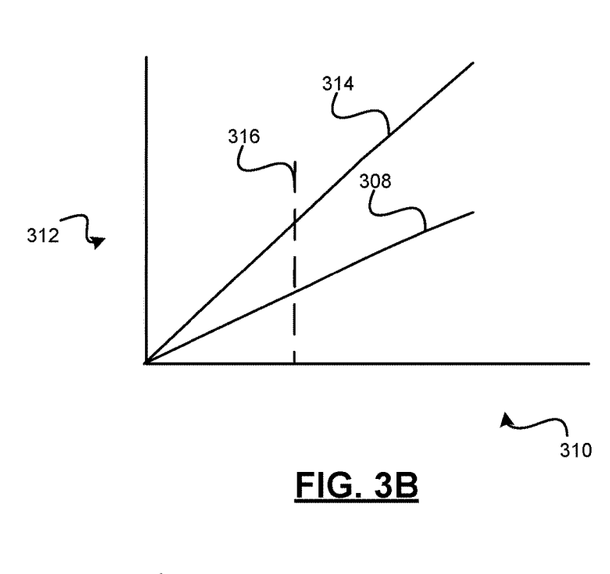

The vehicle brake deceleration data monitoring module 104 generates command data 122 to activate pulsating of the vehicle brakes 26. For example, the pulsating can occur with a cycle time (e.g., one second), a releasing time (e.g., 400) milliseconds), and a brake activation time (e.g., 600 milliseconds). The vehicle brake deceleration data monitoring module 104 receives and collects deceleration data 124 in response to the commands that are sent to pulsate the vehicle brakes 26. For example, the vehicle brake deceleration data monitoring module 104 averages the deceleration information per command pulse and optionally applies a speed-based correction factor to the average. The vehicle brake deceleration data monitoring module 104 then associates the average deceleration information to the commanded value to obtain the data 308 such as shown in FIG. 3B, where the brake pressure is shown along the x-axis 310 and the deceleration data is shown along the y-axis 312. The actual data 308 is shown in FIG. 3B, in comparison to desired data 314.

In various embodiments, the vehicle brake deceleration data monitoring module 104 performs one or more quality checks on the collected data such as, but not limited to, ensuring a minimum number of data points, performing a regression check, etc., and then stores the vehicle braking deceleration data 120 in the deceleration information datastore 112.

The trailer brake data determination module 106 receives as input the trailer braking deceleration data 120) stored in the deceleration information datastore 112. The trailer brake data determination 106 determines from the trailer braking deceleration data 120 the commanded value 306 (FIG. 3A) in which deceleration begins. The trailer brake deceleration data monitoring module 106 defines a minimum activation energy (MAE) threshold 130 based on the determined commanded value.

In various embodiments, trailer brake data determination 106 determines a maximum deceleration value 307 (FIG. 3A) when the commanded brake pressure reaches one hundred percent from the trailer brake deceleration data. The trailer brake deceleration data monitoring module 106 defines a maximum trailer induced deceleration (MTID) threshold 132 based on the determined deceleration value.

The vehicle brake data determination module 108 receives as input the vehicle braking deceleration data 128 stored in the deceleration information datastore 112, and the MTID threshold 132. Based on the received data, the vehicle brake data determination module 108 determines a vehicle brake torque where the maximum trailer brake output should occur, referred to as the maximum torque control value (MTCV). For example, the vehicle brake torque data determination module 108 determines the slope ($m_{new}$) of the vehicle braking deceleration data 128 using linear regression of the data 128, or other method and then determines the slope ($m_{des}$) of the desired vehicle brake deceleration data using similar analysis of the desired data 314. The vehicle brake data determination module 108 then determines the MTCV based on the MTID threshold and the determined slopes as:

$$MTCV = \frac{MTID}{m_{des} - m_{new}}.$$

Figure 3C:
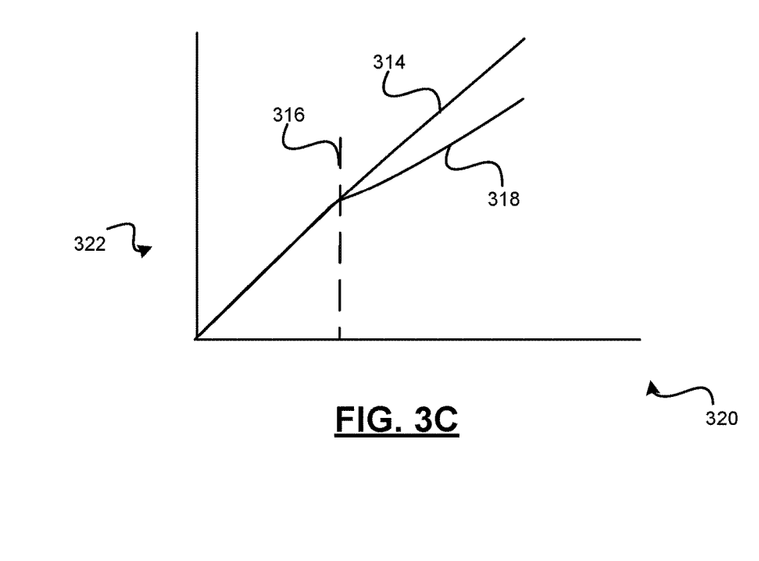

The trailer gain control module receives as input the MAE threshold 130 and MTCV 134. The trailer brake control module 134 generates gain control data 136, for example as shown as the data 318 in FIG. 3C where the brake pressure is shown along the x-axis 320 and the deceleration data is shown along the y-axis 322, based on the received data 130, 134. The gain data 136 is then used to generate control signals to the trailer brakes of the trailer braking system 56 during operation of the vehicle 10.

Figure 4:
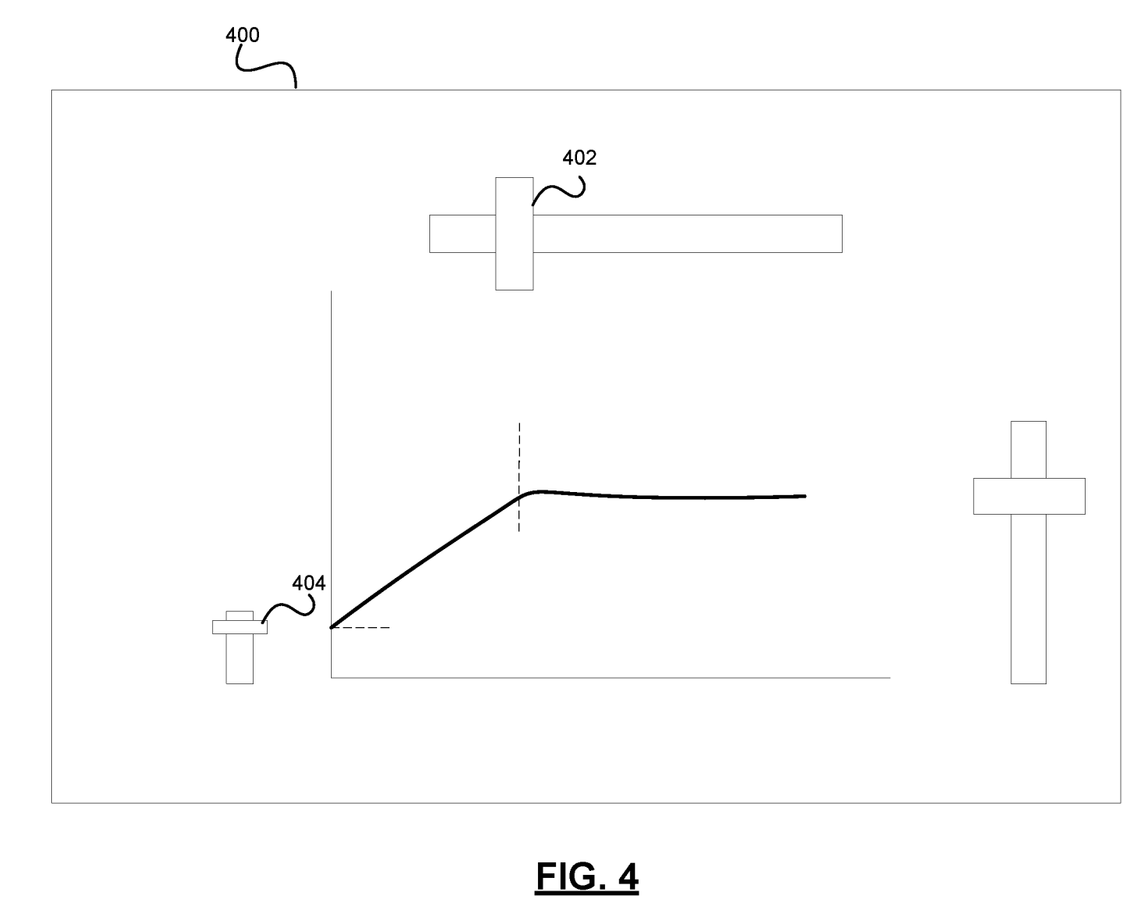
FIG. 4 is an illustration of an interface that may be used by a user for providing values for controlling trailer braking.

Optionally, in various embodiments, the trailer gain control module 110 receives as input interface data 138 from an external source. For example, a user manipulable interface, such as the interface 400 shown in FIG. 4, may be presented to a user. The user interface 400 includes configurable elements 402, 404 such as the slider bars shown that allow the user to manually set the MAE value and the MTCV value. These manually set values are received via the interface data 138 and used by the trailer gain control module 110 to determine the gain control data 136.

Figure 5:
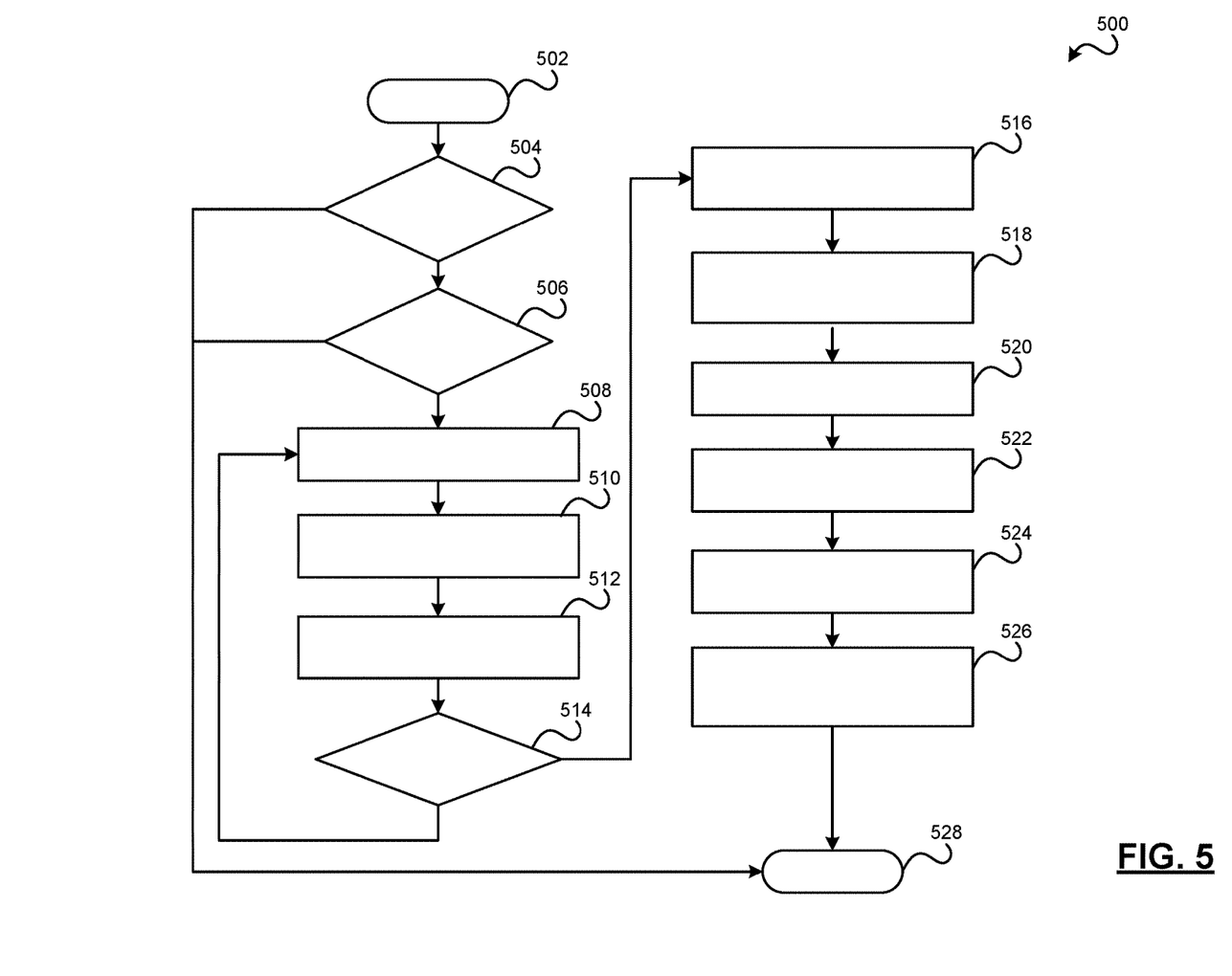
FIG. 5 is a flowchart of a method for learning values and controlling trailer braking, in accordance with exemplary embodiments.

With reference now to FIG. 5 and with continued reference to FIGS. 1-4, a flowchart is provided of a method 500 for controlling braking of the trailer 12 and/or the vehicle 10 of FIG. 1 as performed by the braking control system 100, in accordance with exemplary embodiments. As can be appreciated in light of the disclosure, the order of operation within the method is not limited to the sequential execution as illustrated in FIG. 5 but may be performed in one or more varying orders as applicable and in accordance with the present disclosure. In various embodiments, the method 500 can be scheduled to run based on one or more predetermined events, and/or can run continuously during operation of the vehicle 10.

In one example, the method 500 may begin at 502. It is determined whether trailering is initiated at 504, for example, through a trailering application. When trailering is not initiated at 504, the method 500 may end at 528.

When trailering is initiated at 504, the vehicle speed is monitored at 506. When the vehicle speed exceeds a threshold at 506, the pulsating brake control is initiated. For example, the brakes of the trailer braking system 56 are pulsated at 508. The deceleration information is collected and assigned to the trailer brake command at 510. A correction factor is determined based on external resistance at 512. Once the collected data is sufficient at 514, the minimum activation energy (MAE) is determined at 516 and the trailer deceleration data is stored at 518.

Thereafter, the brakes 26 of the vehicle 10 are pulsated at 520 until the vehicle 10 comes to a stop. The deceleration information is collected and assigned to the vehicle brake command at 522. The maximum torque control value (MTCV) is determined based on the vehicle deceleration information at 524. Thereafter, the minimum activation energy (MAE) and the maximum torque control value (MTCV) are used to establish the gain control curve for controlling the trailer brakes of the trailer braking system 56. The method may end at 528.

The result of the method 500 is a much more responsive trailer braking system where trailer is braking in tandem with the vehicle braking is performed to achieve optimal deceleration performance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling deceleration of a vehicle towing a trailer, comprising:
   generating, by a processor, trailer brake command data to separately characterize a trailer braking system of the trailer by pulsating trailer brakes of the trailer braking system of the trailer, the pulsating of the trailer brakes comprising first command pulses having a respective cycle time comprising a respective brake activation time and a respective releasing time;
   in response to the generating the trailer brake command data, storing, in a data storage device of the vehicle, a first set of deceleration data characterizing first braking authority of the trailer braking system by averaging deceleration information per command pulse of the first command pulses;
   generating, by the processor, vehicle brake command data to separately characterize vehicle brakes of the vehicle by pulsating the vehicle brakes of the vehicle, the pulsating of the vehicle brakes comprising second command pulses having a respective cycle time comprising a respective brake activation time and a respective releasing time, wherein the pulsating of the vehicle brakes is separate from the pulsating of the trailer brakes;
   in response to the generating the vehicle brake command data, storing, in the data storage device, a second set of deceleration data characterizing second braking authority of the vehicle brakes by averaging deceleration information per command pulse of the second command pulses;
   determining, by the processor, a minimum activation energy (MAE) threshold and a maximum trailer induced deceleration (MTID) threshold based on the first set of deceleration data characterizing first braking authority of the trailer braking system;
   determining, by the processor, a maximum vehicle brake torque control value (MTCV) where a maximum trailer brake output should occur based on a relationship between the MTID threshold and a slope of the second set of deceleration data characterizing braking authority of the vehicle brakes; and providing, by the processor, the MAE threshold and the MTCV to the trailer braking system to adaptively control the trailer brakes of the trailer during operation of the vehicle based on the MAE threshold and the MTCV.

2. The method of claim 1, further comprising associating the first set of deceleration data with the trailer brake command data signal to obtain a first set of associated data, associating the second set of deceleration data with the vehicle brake command data signal to obtain a second set of associated data, and wherein the storing comprises storing the first set of associated data and the second set of associated data, and wherein the determining the maximum vehicle brake torque control value is based on the first set of associated data and the second set of associated data.

3. The method of claim 1, further comprising determining, by the processor, the maximum trailer induced deceleration threshold based on the first set of deceleration data, and wherein the determining the maximum vehicle brake torque control value is based on the maximum trailer induced deceleration threshold.

4. The method of claim 3, further comprising determining a first slope from the second set of deceleration data; determining a second slope from a desired set of deceleration data; and wherein the determining the maximum vehicle brake torque control value is based on the maximum trailer induced deceleration threshold divided by a difference between the second slope and the first slope.

5. The method of claim 1, further comprising receiving, based on user interface data, a desired maximum vehicle brake torque threshold, and wherein the determining the maximum vehicle brake torque control value is based on the desired maximum vehicle brake torque threshold.

6. The method of claim 5, further comprising receiving, based on user interface data, a desired minimum activation energy threshold, and wherein the determining the maximum vehicle brake torque control value is based on the desired maximum vehicle brake torque threshold.

7. The method of claim 1, further comprising, applying a speed-based correction factor to at least one of the first set of deceleration data and the second set of deceleration data.

8. The method of claim 1, further comprising determining, by the processor, gain control data based on the maximum vehicle brake torque control value and the minimum activation energy threshold, and wherein the trailer brakes are controlled based on the gain control data.

9. The method of claim 1, receiving, based on user interface data, a desired minimum activation energy threshold, and wherein the determining the minimum activation energy threshold is based on the desired minimum activation energy threshold.

10. The method of claim 1, further comprising assigning, by the processor, trailer braking commands to specific vehicle braking torques to achieve a desired combined deceleration of the vehicle and the trailer, wherein determining the MCTV comprises determining the MCTV in accordance with equation $$MTCV = \frac{MTID}{m_{des} - m_{new}},$$

where $m_{new}$ is the slope of the second set of deceleration data characterizing braking authority of the vehicle brakes and $m_{des}$ is a second slope corresponding to desired vehicle brake deceleration data.

11. A system for controlling deceleration of a vehicle towing a trailer, comprising:

a computer readable medium configured to store deceleration data associated with the vehicle towing the trailer; and a processor onboard the vehicle and configured to:
generate trailer brake command data to separately characterize a trailer braking system of the trailer by pulsating trailer brakes of the trailer braking system of the trailer, the pulsating of the trailer brakes comprising first command pulses having a respective cycle time comprising a respective brake activation time and a respective releasing time;

in response to the generating the trailer brake command data, store, in the computer readable medium, a first set of deceleration data characterizing first braking authority of the trailer braking system by averaging deceleration information per command pulse of the first command pulses;

generate vehicle brake command data to separately characterize vehicle brakes of the vehicle by pulsating the vehicle brakes of the vehicle, the pulsating of the vehicle brakes comprising second command pulses having a respective cycle time comprising a respective brake activation time and a respective releasing time, wherein the pulsating of the vehicle brakes is separate from the pulsating of the trailer brakes;

in response to the generating the vehicle brake command data, store, in the computer readable medium, a second set of deceleration data characterizing second braking authority of the vehicle brakes by averaging deceleration information per command pulse of the second command pulses;

determine a minimum activation energy (MAE) threshold and a maximum trailer induced deceleration (MTID) threshold based on the first set of deceleration data characterizing first braking authority of the trailer braking system;

determine a maximum vehicle brake torque control value (MTCV) where a maximum trailer brake output should occur based on a relationship between the MTID threshold and a slope of the second set of deceleration data characterizing braking authority of the vehicle brakes; and provide the MAE threshold and the MTCV to the trailer braking system to adaptively control the trailer brakes of the trailer during operation of the vehicle based on the MAE threshold and the MTCV.

12. The system of claim 11, wherein the processor is further configured to: determine a maximum trailer induced deceleration threshold based on the first set of the deceleration data; and determine the maximum vehicle brake torque control value based on the maximum trailer induced deceleration threshold.

13. The system of claim 12, wherein the processor is further configured to: determine a first slope from the second set of the deceleration data; determine a second slope from a desired set of the deceleration data; and determine the maximum vehicle brake torque control value based on the maximum trailer induced deceleration threshold divided by a difference between the second slope and the first slope.

14. The system of claim 11, wherein the processor is further configured to: receive, based on user interface data, a desired maximum vehicle brake torque threshold; and determine the maximum vehicle brake torque control value based on the desired maximum vehicle brake torque threshold.

15. The system of claim 14, wherein the processor is further configured to: receive, based on user interface data, a desired minimum activation energy threshold; and determine the maximum vehicle brake torque control value based on the desired maximum vehicle brake torque threshold.

16. The system of claim 11, wherein the processor is further configured to: determine a minimum activation energy threshold based on the first set of the deceleration data; and control the trailer brakes of the trailer further based on the minimum activation energy threshold.

17. The system of claim 11, wherein the processor is further configured to: associate the first set of the deceleration data with the trailer brake command data to obtain a first set of associated data; associate the second set of the deceleration data with the vehicle brake command data to obtain a second set of associated data; store the first set of associated data and the second set of associated data; and determine the maximum vehicle brake torque control value based on the first set of associated data and the second set of associated data.

18. The system of claim 11, wherein the processor is further configured to: determine gain control data based on the maximum vehicle brake torque control value and the minimum activation energy threshold; and control the trailer brakes of the trailer based on the gain control data.

19. The system of claim 18, wherein the processor is further configured to: receive, based on user interface data, a desired minimum activation energy threshold; and determine the minimum activation energy threshold based on the desired minimum activation energy threshold.

20. A vehicle, comprising:
a connection apparatus configured to connect to a trailer braking system of a trailer having trailer brakes;
a computer readable medium configured to store deceleration values associated with the vehicle towing the trailer; and
a processor onboard the vehicle and configured to:
generate trailer brake command data to separately characterize the trailer braking system of the trailer by pulsating the trailer brakes of the trailer braking system of the trailer, the pulsating of the trailer brakes comprising first command pulses having a respective cycle time comprising a respective brake activation time and a respective releasing time;
in response to the generating the trailer brake command data, store, in the computer readable medium, a first set of deceleration data characterizing first braking authority of the trailer braking system by averaging deceleration information per command pulse of the first command pulses;
generate vehicle brake command data to separately characterize vehicle brakes of the vehicle by pulsating the vehicle brakes of the vehicle, the pulsating of the vehicle brakes comprising second command pulses having a respective cycle time comprising a respective brake activation time and a respective releasing time, wherein the pulsating of the vehicle brakes is separate from the pulsating of the trailer brakes;
in response to the generating the vehicle brake command data, store, in the computer readable medium, a second set of deceleration data characterizing second braking authority of the vehicle brakes by averaging deceleration information per command pulse of the second command pulses;
determine a minimum activation energy (MAE) threshold and a maximum trailer induced deceleration (MTID) threshold based on the first set of deceleration data characterizing first braking authority of the trailer braking system;
determine a maximum vehicle brake torque control value (MTCV) where a maximum trailer brake output should occur based on a relationship between the MTID threshold and a slope of the second set of deceleration data characterizing braking authority of the vehicle brakes; and
provide the MAE threshold and the MTCV to the trailer braking system to adaptively control the trailer brakes of the trailer during operation of the vehicle based on the MAE threshold and the MTCV.

* * * * *